United States Patent [19]
Moyer

[11] Patent Number: 5,992,390
[45] Date of Patent: Nov. 30, 1999

[54] FUEL EFFICIENT HYBRID INTERNAL COMBUSTION ENGINE

[76] Inventor: David F. Moyer, 5 Weatherby Rd., Hanover, N.H. 03755-1923

[21] Appl. No.: 09/013,211

[22] Filed: Jan. 26, 1998

Related U.S. Application Data

[63] Continuation of application No. 08/901,474, Jul. 28, 1997, which is a continuation of application No. 08/593,091, Jan. 29, 1996, which is a continuation of application No. 08/309,863, Sep. 21, 1994.

[51] Int. Cl.⁶ .............................. F02M 25/07; F01L 25/08
[52] U.S. Cl. ........................................ 123/481; 123/198 F
[58] Field of Search ............................ 123/90.15, 90.16, 123/198 F, 481, 316, 321, 322

[56] References Cited

U.S. PATENT DOCUMENTS

| | | | |
|---|---|---|---|
| 3,969,614 | 7/1976 | Moyer et al. | 235/150.21 |
| 4,512,154 | 4/1985 | Ueno | 123/198 F |
| 5,123,397 | 6/1992 | Richeson | 123/568 |
| 5,520,145 | 5/1996 | Nagai et al. | 123/90.17 |
| 5,529,549 | 6/1996 | Moyer | 477/189 |
| 5,549,095 | 8/1996 | Goto et al. | 123/316 |
| 5,568,795 | 10/1996 | Robichaux et al. | 123/198 F |
| 5,606,941 | 3/1997 | Trzmiel et al. | 123/90.15 |
| 5,695,430 | 12/1997 | Moyer | 477/189 |

*Primary Examiner*—Andrew M. Dolinar
*Assistant Examiner*—Mahmoud M. Gimie

[57] ABSTRACT

A method and apparatus for improving efficiency and reducing emissions of a vehicle's multi-cylinder internal combustion engine. The engine runs at best BSFC by intermittently disabling cylinders for torque control. The engine runs as an air compressor for braking, and after braking, runs as an air motor driven by the stored compressed air. The air motor capability permits stopping all fuel flow when the accelerator is released at any engine speed. Variable engine valve control eliminates the conventional throttle and EGR valve, and is utilized for maximum thermodynamic efficiency during air operation. A camshaft retard is utilized to minimize the pressurized components and to prevent cooling the catalyst during air motor operation.

16 Claims, 1 Drawing Sheet

FUEL EFFICIENT HYBRID INTERNAL COMBUSTION ENGINE

CROSS REFERENCE

This application is a continuation-in-part of Ser. No. 08/901,474, Jul. 28, 1997, U.S. Pat. No. 5,832,885, which is a continuation-in-part of Ser. No. 08/593,091, Jan. 29, 1996, U.S. Pat. No. 5,695,430, which is a continuation-in-part of Ser. No. 08/309,863, Sep. 21, 1994, U.S. Pat. No. 5,529,549.

FIELD OF THE INVENTION

The present invention relates to the field of internal combustion engines; more particularly to multi-functional hybrid engines.

BACKGROUND OF THE INVENTION

This invention describes a method and apparatus for increasing the fuel efficiency and reducing the undesirable emissions of an internal combustion engine. While the general principles and teachings hereinafter disclosed are applicable to all combustion engines, the invention is hereinafter described in detail in connection with its application to a multi-cylinder, reciprocating, fuel injected, spark ignited, internal combustion engine.

As used herein, the term "conventional engine" refers to a device which converts heat energy, released by the combustion of a fuel, into mechanical energy in a rotating output shaft of the engine. Also, the term "valve control" is defined as controlling the intake and exhaust valves of a cylinder by varying their time of opening and closing or not opening at all, while driven by a conventional rotating camshaft. Also, the term "air compressor" is defined as using the engine to take energy from the inertial load driven by the engine to compress air in the engine cylinders and then store it in a reservoir. Also, the term "air motor" is defined as powering the engine by the controlled release of compressed air into the engine cylinders. Also the term "brake specific fuel consumption" (BSFC) is defined as the amount of fuel consumed to produce a given power at the engine drive shaft.

In the United States, the Federal law requires that passenger vehicles be tested over an urban driving cycle while the fuel consumed and exhaust emissions generated are measured. This driving cycle has many periods of acceleration, deceleration and idle, with few periods of steady state speed, and is intended to reflect typical urban usage. During deceleration and idle operation it is difficult to control emissions in typical automobile engines—particularly throttled engines—because of the low manifold pressures at these times. Also, when the accelerator is released, fuel continues to be consumed even though no energy is required from the engine. The emissions measured during this test must be less than those specified by law at the time of manufacture, and the fuel consumed is used in the determination of the manufacturer's Corporate Average Fuel Economy (CAFE) during that year.

SUMMARY OF THE INVENTION

The object of this invention is to improve the fuel efficiency and reduce the emissions of a conventional internal combustion engine while powering a vehicle in normal operating conditions.

The method used by this invention to accomplish this object is to operate each engine cylinder in one of four functional modes. Mode selection is accomplished by the controller in response to operator demand indicated by the accelerator and brake pedal positions. These functional modes are:

1. Gas Motor: intake atmospheric fuel/air mixture, compress it, ignite it, exhaust it to exhaust line.
2. Compressor: intake atmospheric air, compress it, exhaust it to pressure tank.
3. Air Motor: intake compressed air, expand it, exhaust it to atmosphere.
4. Disabled: no intake, compress and expand internal air, no exhaust.

While the accelerator is depressed, engine power is regulated by the individual valve controls which operate each cylinder at its minimum BSFC (maximum fuel economy). When this operating point results in more than the desired torque, some cylinders are disabled intermittently by keeping their valves closed and shutting off their fuel. This provides the fuel economy of a variable displacement engine. During engine operation, the valve overlap and exhaust gas retention (EGR) are set for most efficient operation and least emissions by the valve control in the active cylinders. There are no throttling losses since there is no throttle.

When the accelerator is released, all the cylinders are disabled and all fuel flow stops. While the engine is rotating, the cylinders act as pneumatic springs, and the engine drag is greatly reduced.

When the brake pedal is depressed all fuel flow stops, and the exhaust manifold is switched from the exhaust line to the air storage tank. The engine now acts as an air compressor and the resultant compressed air is stored in a tank. The valve control achieves the desired brake torque and maintains it efficiently as the pressure in the tank rises. This saves the energy normally lost in the brakes for accelerating the vehicle after the braking action. If the required brake torque is larger than that provided by full engine compression, the controller regulates the conventional brakes to supply the additional torque.

When the accelerator is again depressed, the timing of the camshaft relative to the crankshaft is shifted 90 degrees and the exhaust valves now open on the intake stroke followed by the intake valves opening on the exhaust stroke. Again, the valve control achieves the desired engine torque as the compressed air flows from the storage tank to the cylinder on the intake stroke and from the cylinder on the exhaust stroke to the atmosphere, causing the engine to run as an air motor. It continues to run as an air motor until all the air stored during the previous braking action is used. The camshaft is then shifted to normal timing, fuel is added, and the firing engine is controlled as previously described. If the vehicle was braked to a stop, the engine will not be rotating and uses no fuel. Upon depression of accelerator, the air motor will drive the vehicle away from the stop and continue to power the vehicle until the air is used. Thus, the energy dissipated as brake heat in the conventional vehicle is used to improve engine efficiency.

DESCRIPTION OF PRIOR ART

The principle methods used by manufacturers to meet the fuel and emission laws is to reduce the vehicle's size, weight, and aerodynamic drag; and also to utilize computer control of the engine operating variables as described in my earlier U.S. Pat. No. 3,969,614 which is incorporated herein by reference. My U.S. Pat. No. 5,529,594, issued Jun. 25, 1996, to which the present improvements are related, used a computer to control the engine valves and distribution valves to store air compressed by the engine operating as an air compressor during braking. It also used the valve control to disable cylinders during regular engine operations to provide a variable displacement engine in cylindrical increments. It is also incorporated herein by reference.

My recent application of Ser. No. 08/593,091, filed Jan. 29, 1996, now U.S. Pat. No. 5,695,430, and its division 08/901,474 filed Jul. 21, 1997, describe a new method of operating a vehicle with an improved version of the engine described in U.S. Pat. No. 5,529,594. The present application has a different and improved method of valve control. Further, it eliminates one distribution valve, one tank valve and one pressure tank from the above application, obviates the need for pressurization of the intake manifold, prevents cooling of the catalyst during air motor operation, and describes additional apparatus and improved operating methods.

Robichaux in U.S. Pat. No. 5,568,795 shows a system for selecting the operating mode of a variable displacement engine where it is operated on a fractional number of cylinders. It uses a controller to determine limits within which the engine may be operated on a fractional number of cylinders and then disables the appropriate number of cylinders. Unlike the present invention, it does not select the number for lowest BSFC or even heat distribution, nor does it control the cylinder disablement on a real time basis (changing the disablement pattern from one engine revolution to another). It also uses one or more intake air throttles, rather than utilizing the engine valves as throttles for the individual cylinders as in the present invention. Further, that system does not provide for disabling all the cylinders whenever the accelerator pedal is released, thereby saving all idle fuel at any engine speed as in the present invention.

Other proposals for accomplishing similar improvements are to be found in the prior art, but most rely on significant additional equipment not found on present automobiles. The present invention requires only the addition of an air storage tank, exhaust distribution valve, cam phase shifter, valve disablers and their fulcrum regulator, sensors for the accelerator and brake pedals, and an air tank pressure sensor.

REFERENCE NUMBERS LIST

Figure 1:
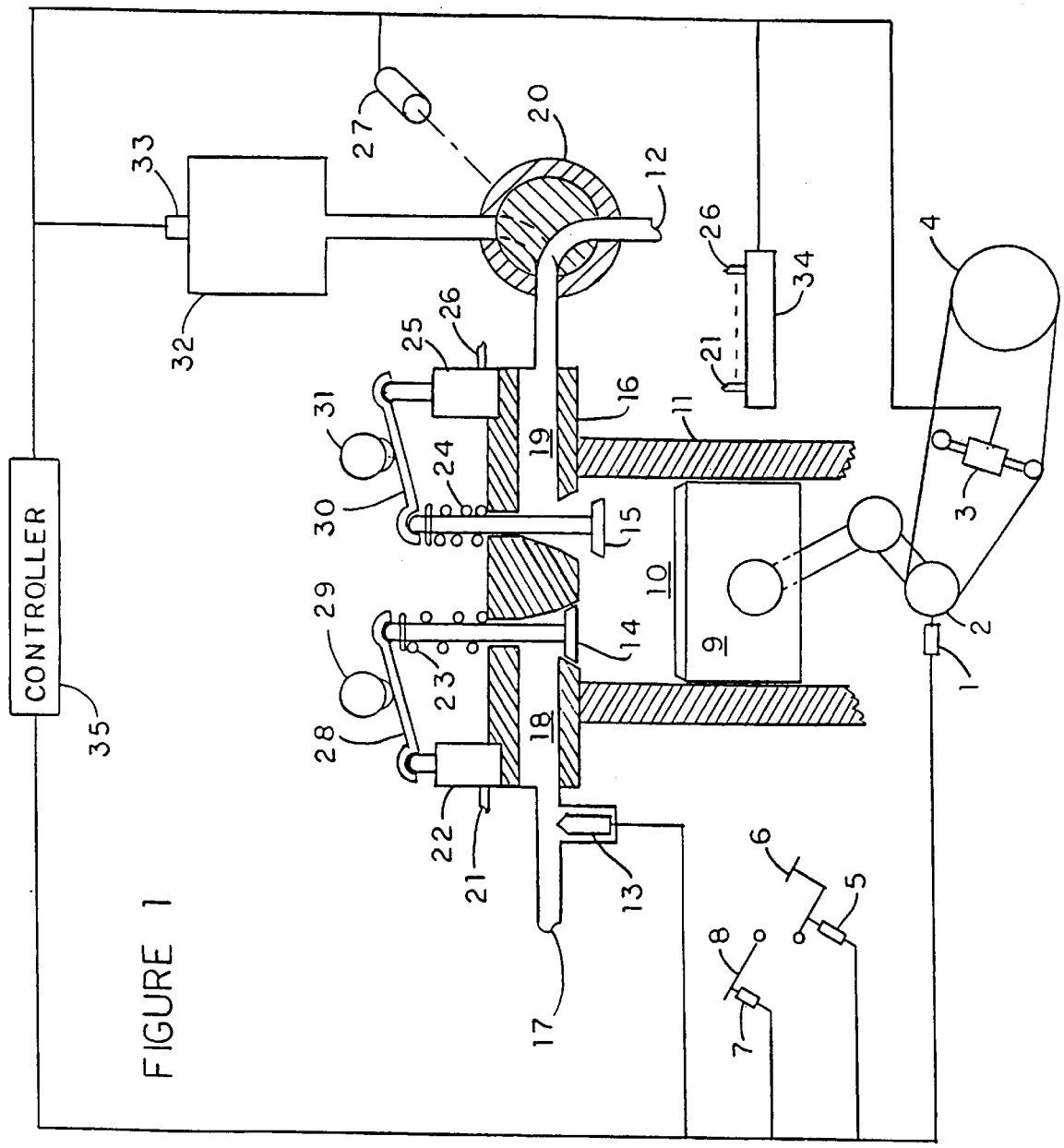
FIG. 1 is a schematic block diagram of the preferred embodiment of the control system of a multi-cylinder, reciprocating, fuel injected, spark ignited, internal combustion engine. A section of one of the cylinders is shown in conjunction with other elements of the system. The reference numbers list identifies each part shown.

| | |
|---|---|
| 1 crankshaft sensor | 16 engine head |
| 2 crankshaft | 17 intake line |
| 3 cam phase shifter | 18 intake manifold |
| 4 camshaft pulley | 19 exhaust manifold |
| 5 brake pedal sensor | 20 distribution valve |
| 6 brake pedal | 21 intake fulcrum line |
| 7 accelerator pedal sensor | 22 intake valve fulcrum |
| 8 accelerator pedal | 23 intake valve spring |
| 9 piston | 24 exhaust valve spring |
| 10 cylinder | 25 exhaust valve fulcrum |
| 11 engine block | 26 exhaust fulcrum line |
| 12 exhaust line | 27 control/sensor for 20 |
| 13 fuel injector | 28 intake rocker arm |
| 14 intake valve | 29 camshaft intake cam |
| 15 exhaust valve | 30 exhaust rocker arm |
| 31 camshaft exhaust cam | 34 fulcrum regulator |

-continued

REFERENCE NUMBERS LIST

| | |
|---|---|
| 32 pressure tank | 35 controller |
| 33 pressure sensor | |

DETAILED DESCRIPTION OF THE INVENTION

FIG. 1, shows a cross section of one cylinder 10 of a vehicle engine with engine block 11 which may include a plurality of cylinders. A piston 9 is mounted for reciprocal motion within cylinder 10. A spark plug (not shown) ignites the fuel-air mixture in the usual fashion. Piston 9 is mechanically connected to a crankshaft 2 which transforms the reciprocal motion to rotary motion in the usual fashion. Also in the usual fashion, the crankshaft is connected to the wheels of the vehicle through a transmission and differential (not shown). The valve springs 23 and 24, the valve rocker arms 28 and 30, and the valve cams 29 and 31 are conventional parts of the valve train for poppet valves. The valve fulcrums 22 and 25 are used to provide engine valve control and are those described in my previous application Ser. No. 08/901,474. Pressure lines 21 and 26 connect the fulcrums 22 and 25 to the hydraulic regulator 34 through which the controller 35 exercises engine valve control. The distribution valve 20 variably connects the exhaust manifold 19 to either the exhaust line 12, or the pressure tank 32, or closes off all three ports. The cam phase shifter 3 is functionally similar to those described in U.S. Pat. No. 5,606,941 or U.S. Pat. No. 5,520,145.

The inputs for a system controller 35 are sensors for: stored air pressure 33, distribution valve actuator/sensor 27, accelerator pedal position 7, brake pedal position 5, crankshaft position 1, and current engine system conditions (not shown). The outputs from the controller 35 go to distribution valve actuator/sensor 27, fulcrum regulator 34 (through which the controller 35 exercises engine valve control), fuel injector 13, and cam phase shifter 3. The camshaft pulley 4 is connected to the crankshaft 2 by a timing belt which is adjusted by timing belt shifter 3 between a "normal" position and an adjustable "retarded" position. The "retarded" position causes the intake valves to open during the piston exhaust stroke and the exhaust valves to open on the piston intake stroke (which immediately follows the exhaust stroke).

The method of this invention is best described by showing the functions of the system elements as a vehicle with this hybrid engine drives the urban test cycle. When the vehicle was last braked to a stop, all the engine valves 14 & 15 were enabled, the distribution valve 20 was set to its "neutral" position (all ports closed) and the cam phase shifter 3 was set to its "retarded" position when the engine rpm fell to zero.

The first 20 seconds of the test call for the engine to idle while the vehicle is stationary. Since the hybrid does not idle, no fuel is consumed nor are any emissions generated.

The period from the $21^{st}$ through the $32^{nd}$ second calls for an acceleration for which the accelerator pedal 8 is depressed. This causes the controller 35 to operate the engine as an air motor by moving the distribution valve 20 to the "tank" position (connecting the pressure tank 32 to the exhaust manifold 19). Pressurized air flows from tank 32, through exhaust manifold 19, through the enabled exhaust valve 15, and into the cylinder 10, forcing piston 9 down and accelerating the vehicle. FIG. 1 shows the position of all the system elements at this time but with intake valve 14 disabled.

When the piston 9 reaches the bottom of its stroke, exhaust valve 15 closes and intake valve 14 opens with zero valve overlap. The rising piston 9 then exhausts the cylinder air through intake valve 14, into the intake manifold 18, and out the intake line 17.

When a subsequent piston 9 reaches the top of its stroke, its exhaust valve 15 opens and fills the cylinder 10 with air from the tank 32. The piston 9 moves down on the intake stroke until the cylinder volume reaches a point where the exhaust valve 15 closes and the air then expands to atmospheric pressure at the bottom of the stroke. The point of valve 15 closure will vary with the exhaust manifold pressure—the higher the pressure, the sooner valve 15 will close to allow full expansion to atmospheric pressure. This assures maximum propulsion efficiency with full expansion. The expanded air will be discharged through the intake line 17.

The controller 35 senses the operator demand for engine power from the accelerator pedal sensor 7 and compares this sensor reading and the current engine conditions with the stored table of desired engine conditions. When this operator demand is less than that delivered by the first described air motor function, the valve fulcrums 22 and 25 of some of the cylinders are adjusted so that valves 14 and 15 remain closed, and those cylinders are disabled. The controller 35 selects the number of disabled cylinders based on the power demanded and then selects different cylinders at different times in order to keep their temperatures the same and to dynamically balance the engine for the smoothest operation.

If the engine speed and required torque are such as to require an excessive time between cylinder expansions, then the distribution valve 20 is adjusted to reduce the exhaust manifold pressure. This allows the time between cylinder expansions to be reduced with some reduction in thermodynamic efficiency.

When this operator demand is more than can be delivered by the first described air motor function, the controller 35 delays closing the exhaust valve 15, which allows the volume of air from the tank 32, exhaust manifold 19, and cylinder 10 to expand against the piston 9 before closing valve 15 and finish with the expansion of the cylinder volume alone. The work done on the piston thus increases because of the smaller pressure drop during expansion, but the thermodynamic efficiency is reduced. When the tank 32 pressure drops to that minimum which will still assure the next restart or else is insufficient to meet the present operator demand, the shifter 3 is returned to the "normal" position, the distribution valve 20 is moved to the "exhaust" position (connecting the exhaust manifold 19 to the exhaust line 12), fuel is injected, and internal combustion begins.

The controller 35 adjusts the spark, EGR, and fuel to operate each cylinder at its minimum BSFC. This minimum BSFC is obtained from a table of steady-state engine operation measurements stored in a table in the controller 35. This table shows the torque and BSFC at the various engine speeds and the spark, fuel, and valve settings to obtain them. As with the air motor operation, if this results in too much engine torque, controller 35 selectively disables cylinders to achieve maximum fuel economy, acceptable emissions, equal heat distribution, and smooth engine operation at the desired torque.

When the time between cylinder firings becomes excessive, the fuel/air charge admitted to the active cylinder 10 is reduced by early intake valve 14 closure. During the valve open time, the intake stroke ingests the charge from the intake manifold 18 at atmospheric pressure (no throttle). After early valve closure, power is absorbed to create the cylinder vacuum equivalent to that of part throttle in a conventional engine, but without the losses of a throttle pressure drop. The absorbed power is returned on the compression stroke as with a pneumatic spring. However, the thermal efficiency drops due to the lower combustion temperature of the reduced charge. Thus, the valve control is only employed to reduce the time between firings to an acceptable level while maintaining the largest charge possible for maximum fuel economy.

The $33^{rd}$ second calls for a slight deceleration from 22.4 to 22 miles per hour (MPH). When the operator releases the accelerator pedal 8, and depresses the brake pedal 6, the controller 35 halts all fuel flow and selectively disables cylinders to provide the required brake torque. This will save idle fuel, but will provide no compression energy to store compressed air due to the light brake requirement. When the brake requirement is increased at the $37^{th}$ second, compression energy becomes available as the brake pedal is further depressed.

When the brake pedal 6 is depressed to this extent, controller 35 switches the distribution valve 20 from "exhaust" to "tank" (exhaust manifold 19 disconnected from exhaust line 12 and connected to pressure tank 32) and receives inputs from the brake pedal sensor 5 and pressure tank sensor 33. Controller 35 then sends an output to exhaust valve fulcrum 25 which delays the exhaust valve 15 opening until the cylinder 10 undergoing compression reaches a pressure equal to that of the exhaust manifold 19. Controller 35 also delays the intake valve 14 opening until the cylinder pressure has fallen to atmospheric, which will reduce the effective brake torque.

Since the brake torque will increase as the pressure rises in tank 32, and the brake sensor 5 input signal may change due to operator demands, means must be provided to maintain the desired brake torque. If higher torque is needed, the exhaust valve 15 opening delay described previously is reduced causing the full manifold pressure to resist the piston earlier in its stroke. For still higher torques, the distribution valve 20 is switched to "neutral", which reduces the storage volume to that of the exhaust manifold 19 and causes the brake pressure to rise more rapidly during the compression stroke. If lower torque is needed, cylinder disabling is used in the same manner as previously described for air motor control.

If the engine speed and required brake torque are such as to require an excessive time between cylinder compressions, the intake valve 14 is closed early. This results in a lower brake torque and a smaller charge of air being added to the tank 32 at each compression, and reduces the braking efficiency.

CONCLUSIONS, RAMIFICATIONS, AND SCOPE

It should be obvious to those skilled in the automotive arts that this invention will provide better fuel economy, and less pollution than the present automobile engine while maintaining good drivability. It should also be obvious that the expense of implementation will be low since most of the changes required for this invention are minor modifications of standard automotive parts. In particular, most tooling changes are minor, the additional computer program steps are simple and evident, and the additional parts required are inexpensive.

It should be noted that the engine valve control described in this specification could as well be an electric or hydraulic valve without a camshaft. This would, however, increase the implementation cost and reduce fuel economy because of the additional valve power needed.

While the description of the invention is a specific embodiment in a spark ignited engine, it is obvious that a diesel engine or any other internal combustion engine would benefit from the application of this invention. Therefore, the scope of this invention should be determined by the claims which follow.

Based on the forgoing description of the invention, what is claimed is:

1. A method for controlling a vehicle internal combustion engine system wherein system conditions comprising at least the position of the accelerator pedal are delivered to a controller as input signals and said controller's output signals are delivered to engine components comprising at least engine valve controls and fuel injectors, the method comprising steps of:
   (a) said controller compares said input signals with current engine system conditions and a stored table of desired engine operating conditions,
   (b) when said input signal indicates said pedal depression, then said controller selects from said table at least the engine valve setting and fuel injector setting which will produce the lowest brake specific fuel consumption, and compares the torque value of said settings with the torque required by said inputs,
   (c) said controller then determines a pattern of cylinder disablements which will result in said required torque and transmits said output signals to produce said pattern at said lowest brake specific fuel consumption.

2. The method as defined in claim 1 wherein said output signal pattern causes an excessive time between cylinder firings, said controller then selects from said table the minimum increase in said brake specific fuel consumption which produces a satisfactory time between said cylinder firings.

3. The method as defined in claim 2 wherein said minimum increase is obtained by early intake valve closure.

4. The method as defined in claim 1 wherein said output signal pattern is modified to cause smooth engine operation.

5. A method for controlling a vehicle internal combustion engine system wherein system conditions comprising at least the position of the brake pedal are delivered to a controller as input signals and said controller's output signals are delivered to engine components comprising at least engine valve controls and the distribution valve control, the method comprising steps of:
   (a) said controller compares said input signals with current engine system conditions and a stored table of desired engine operating conditions,
   (b) when said input signal indicates said pedal depression, then said controller selects from said table at least the engine valves and distribution valve settings which will produce the most efficient compression and storage of cylinder air, and compares the torque value of said settings with the brake torque required by said inputs,
   (c) said controller then transmits an output signal to set the distribution valve to the tank position, and determines a pattern of cylinder disablements which will result in said required torque, and transmits said output signals to produce said pattern at said compression efficiency.

6. The method as defined in claim 5 wherein said output signal pattern causes an excessive time between cylinder compressions, said controller then selects from said table the minimum decrease in said air compression braking efficiency which produces a satisfactory time between said cylinder compressions.

7. The method as defined in claim 6 wherein said minimum decrease is obtained by early intake valve closure.

8. The method as defined in claim 5 wherein said output signal pattern is modified to cause smooth braking operation.

9. A method for controlling a vehicle internal combustion engine system wherein system conditions comprising at least the positions of the accelerator pedal and brake pedal are delivered to a controller as input signals and said controller's output signals are delivered to engine system components comprising at least engine valve controls, fuel injectors, and distribution valve and cam phase shifter, the method comprising the steps of:
   (a) said controller compares said input signals with current engine system conditions and a stored table of desired engine operating conditions,
   (b) when said accelerator pedal position indicates a depression, then said controller selects from said table the engine valves and distribution valve settings which will produce the most efficient expansion of the stored compressed air in each cylinder, and compares the torque value of said settings with the torque required by said inputs,
   (c) said controller then determines a pattern of cylinder disablements which will result in said required torque, and transmits said output signals to produce said pattern at said expansion efficiency.

10. The method as defined in claim 9 wherein said output signal pattern causes an excessive time between cylinder expansions, said controller then selects from said table the minimum decrease in said expansion efficiency which produces a satisfactory time between said cylinder expansions.

11. The method as defined in claim 6 wherein said minimum decrease is obtained by limiting the exhaust manifold pressure.

12. The method as defined in claim 9 wherein said required torque is greater than that produced with no cylinder disablement, said controller then selects from said table the valve settings causing the minimum decrease in said expansion efficiency which produces said desired torque.

13. The method as defined in claim 9 wherein said output signal pattern is modified to cause smooth air motor operation.

14. The method as defined in claim 9 wherein said table has no settings which will produce enough torque to satisfy said required torque, said controller then generates output signals which set said shifter to normal, set said distribution valve to exhaust line and begin fuel injection for gas motor operation.

15. The method as defined in claim 9 wherein if inputs from said system show that a transition from braking to air motor operation is required, then said controller initiates said transition by setting said shifter to retard.

16. The method as defined in claim 12 wherein said controller causes said distribution valve to connect the air tank to the exhaust manifold and causes said engine valves to control the passage of compressed air into said cylinders and out the intake manifold.

* * * * *